US008941339B2

(12) United States Patent
Zhang et al.

(10) Patent No.: US 8,941,339 B2
(45) Date of Patent: Jan. 27, 2015

(54) APPARATUS AND METHOD FOR MEASURING POSITION DEVIATION OF ROTOR OF PERMANENT MAGNET SYNCHRONOUS MOTOR

(71) Applicant: Delta Electronics, Inc., Taoyuan Hsien (TW)

(72) Inventors: Jia-Min Zhang, Taoyuan Hsien (TW); Jin-Geng Li, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 116 days.

(21) Appl. No.: 13/846,633

(22) Filed: Mar. 18, 2013

(65) Prior Publication Data

US 2014/0145654 A1 May 29, 2014

(30) Foreign Application Priority Data

Nov. 26, 2012 (CN) .......................... 2012 1 0486905

(51) Int. Cl.
*H02P 21/14* (2006.01)

(52) U.S. Cl.
USPC ................. 318/400.02; 318/254; 318/400.13; 318/400.32; 318/400.33; 318/700; 318/701

(58) Field of Classification Search
USPC ............ 318/400.02, 400.13, 400.32, 400.33, 318/700, 254, 701, 807
See application file for complete search history.

(56) References Cited

U.S. PATENT DOCUMENTS

| | | | | |
|---|---|---|---|---|
| 5,144,564 A | * | 9/1992 | Naidu et al. | 318/721 |
| 5,689,165 A | * | 11/1997 | Jones et al. | 318/701 |
| 6,005,364 A | * | 12/1999 | Acarnley | 318/632 |
| 6,940,250 B2 | | 9/2005 | Nishimura et al. | |
| 7,076,340 B1 | | 7/2006 | Inazumi et al. | |
| 2002/0175651 A1 | * | 11/2002 | Kaneko et al. | 318/700 |
| 2002/0189301 A1 | * | 12/2002 | Hosoito et al. | 68/12.02 |
| 2003/0011340 A1 | * | 1/2003 | Odachi et al. | 318/700 |
| 2003/0017054 A1 | * | 1/2003 | Odachi et al. | 417/44.1 |
| 2003/0025475 A1 | * | 2/2003 | Won et al. | 318/701 |
| 2004/0056630 A1 | * | 3/2004 | Kaitani | 318/719 |
| 2004/0070360 A1 | * | 4/2004 | Schulz et al. | 318/700 |
| 2004/0070362 A1 | * | 4/2004 | Patel et al. | 318/701 |
| 2004/0201358 A1 | * | 10/2004 | Kawaji et al. | 318/701 |

(Continued)

FOREIGN PATENT DOCUMENTS

| | | |
|---|---|---|
| CN | 101355337 | 1/2009 |
| CN | 100495897 | 6/2009 |

(Continued)

*Primary Examiner* — Paul Ip
(74) *Attorney, Agent, or Firm* — Lowe Hauptman & Ham, LLP

(57) ABSTRACT

An apparatus for measuring a position deviation of a rotor of a permanent magnet synchronous motor includes a control unit, a power transformation unit, a rotor position estimator and a calculation unit. The control unit receives a d-axis DC voltage signal and a q-axis AC voltage signal and receives an initial value of the rotor position and a high-frequency signal to output a three-phase command signal. The power transformation unit receives the three-phase command signal and outputs a three-phase control signal for controlling the motor. The rotor position estimator receives a three-phase current feedback signal corresponding to an operation of the motor and generates an estimation value of the rotor position. The calculation unit performs calculation to the initial value and the estimation value to generate a deviation value of the rotor position. Moreover, a method for measuring the position deviation is also disclosed herein.

26 Claims, 12 Drawing Sheets

(56) References Cited

U.S. PATENT DOCUMENTS

| | | | |
|---|---|---|---|
| 2004/0245949 A1* | 12/2004 | Ueda et al. | 318/254 |
| 2004/0257028 A1* | 12/2004 | Schulz et al. | 318/802 |
| 2005/0007044 A1* | 1/2005 | Qiu et al. | 318/254 |
| 2005/0012490 A1* | 1/2005 | Ueda et al. | 318/807 |
| 2005/0160771 A1* | 7/2005 | Hosoito et al. | 68/12.16 |
| 2006/0119305 A1* | 6/2006 | Lee et al. | 318/609 |
| 2007/0040528 A1* | 2/2007 | Tomigashi et al. | 318/650 |
| 2007/0046249 A1* | 3/2007 | Tomigashi et al. | 318/807 |
| 2007/0085508 A1* | 4/2007 | Fujitsuna et al. | 318/712 |
| 2007/0145919 A1* | 6/2007 | Hamaoka et al. | 318/254 |
| 2008/0197799 A1* | 8/2008 | Tomigashi | 318/768 |
| 2008/0252250 A1* | 10/2008 | Hida et al. | 318/801 |
| 2009/0021195 A1* | 1/2009 | Tomigashi | 318/400.02 |
| 2009/0033259 A1* | 2/2009 | Cesario et al. | 318/400.04 |
| 2009/0058334 A1* | 3/2009 | Yamamoto | 318/400.02 |
| 2009/0190903 A1* | 7/2009 | Komatsu et al. | 388/803 |
| 2010/0026223 A1* | 2/2010 | Liu et al. | 318/400.33 |
| 2010/0141192 A1* | 6/2010 | Paintz et al. | 318/400.33 |
| 2010/0148753 A1* | 6/2010 | Ha et al. | 324/107 |
| 2010/0181952 A1* | 7/2010 | Cheng | 318/400.33 |
| 2010/0194319 A1* | 8/2010 | Ito et al. | 318/400.13 |
| 2011/0062902 A1* | 3/2011 | Patel et al. | 318/400.02 |
| 2011/0062909 A1* | 3/2011 | Patel et al. | 318/400.32 |
| 2011/0084638 A1* | 4/2011 | Patel et al. | 318/400.32 |
| 2011/0181220 A1* | 7/2011 | Tamai et al. | 318/400.33 |

FOREIGN PATENT DOCUMENTS

| | | |
|---|---|---|
| CN | 102668361 | 9/2012 |
| JP | 2008-182881 | 8/2008 |

* cited by examiner

US 8,941,339 B2

APPARATUS AND METHOD FOR MEASURING POSITION DEVIATION OF ROTOR OF PERMANENT MAGNET SYNCHRONOUS MOTOR

RELATED APPLICATIONS

This application claims priority to Chinese Application Serial Number 201210486905.5, filed Nov. 26, 2012, which is herein incorporated by reference.

BACKGROUND

1. Technical Field

The present disclosure relates to a permanent magnet synchronous motor, and more particularly relates to an apparatus for measuring a position of a rotor of a permanent magnet synchronous motor.

2. Description of Related Art

Generally, a brushless electric motor can be divided into a permanent magnet synchronous motor and a DC brushless motor according to different counter electromotive forces. Particularly, the permanent magnet synchronous motor has a sine-wave counter electromotive force, and can generate a constant torque through a sine-wave stator current.

However, when the permanent magnet synchronous motor (PMSM) is operated, coupling thereof exists between a d-axis magnetic circuit and a q-axis magnetic circuit under a rotary coordinate system (d-q axes), so that an actual inductance matrix of the PMSM is not as same as the inductance matrix obtained by a decoupling analysis on the d and q axes, which results in a certain angle deviation in a method for measuring or estimating an angle of the rotor position through a model of salient-pole motor, and further influences the control effect, especially influencing the control performance under an overload condition.

In order to solve the aforementioned problem, the prior art mostly uses a method of analyzing electromagnetic fields. That is, the acquired parameters of a motor main body is analyzed and calculated to obtain a cross-saturated inductance value or angle error values under different d-q axes currents, so as to perform angle compensation.

However, the aforementioned method requires a large amount of calculation and depends on the accuracy of the parameters of the motor main body, and the parameters of the motor main body always cannot be obtained precisely, so that the aforementioned method is not generally applicable.

Moreover, for a method for actually measuring the angle deviation caused by a saturation effect, it usually needs to inject voltages or currents of different amplitudes and thus certain torques are generated. Meanwhile, in order to keep the motor in a standby state, an additional equipment (e.g., a mechanical internal contracting brake apparatus) is required to lock the motor. As a result, problems such as inconvenience for utilization and poor efficiency are caused in actual operation, also resulting in the condition of limiting the measuring method and limiting the utilization thereof in certain situations, thereby reducing the flexibility of usage and directly increasing the difficulty in application of the aforementioned measuring method.

SUMMARY

An aspect of the present disclosure provides an apparatus for measuring a position deviation of a rotor of a permanent magnet synchronous motor (PMSM), including a control unit, a power transformation unit, a rotor position estimator and a calculation unit. The control unit is configured for receiving a d-axis DC voltage signal and a q-axis AC voltage signal of a rotary coordinate system and configured for receiving an initial value of the rotor position and a high-frequency signal to output a three-phase command signal. The power transformation unit is configured for receiving the three-phase command signal and outputting a three-phase control signal for controlling the motor. The rotor position estimator is configured for receiving a three-phase current feedback signal corresponding to an operation of the motor and generating an estimation value of the rotor position. The calculation unit is configured for performing calculation to the initial value and the estimation value of the rotor position to generate a deviation value of the rotor position.

Another aspect of the present disclosure provides a method for measuring a position deviation of a rotor of a permanent magnet synchronous motor (PMSM), including: transforming a d-axis DC voltage signal and a q-axis AC voltage signal of a rotary coordinate system to a three-phase command signal according to an initial value of the rotor position and a high-frequency signal; transforming the three-phase command signal to a three-phase control signal for controlling the motor; generating an estimation value of the rotor position according to a three-phase current feedback signal correspond to an operation of the motor; and performing calculation to the initial value and the estimation value of the rotor position to generate a deviation value of the rotor position.

DETAILED DESCRIPTION

The present disclosure will be described in details in the following embodiments with reference to the accompanying drawings. However, the embodiments described are not intended to limit the present disclosure. Moreover, it is not intended for the description of operation to limit the order of implementation. Any device with equivalent functions that is produced from a structure formed by a recombination of elements shall fall within the scope of the present disclosure. Moreover, the appending drawings are only used for illustration and are not drawn to scale. For convenience of understanding, the same reference numbers represents the same elements in the following description.

The "about", "approximately" or "substantially" used herein generally refer to a numeral error or scope within 20%, preferably within 10%, and more preferably within 5%. If it is not sated explicitly, the referred numbers are all regarded as approximate values with for example the error or scope represented by the phrases "about", "approximately" or "substantially" or other approximate values.

The phrases "first", "second" and the like used herein are neither intended to specifically designate a sequence or order nor intended to limit the disclosure, and are only used to identify elements or operations described through the same technical terms.

Additionally, the phrases "coupled" or "connected" used herein both refer to that two or more elements physically or electrically contact with each other directly or indirectly, or refer to that two or more elements inter-operate or interact with each other. Moreover, the term "motor" used herein refers to a permanent magnet synchronous motor, unless otherwise specified.

Figure 1:
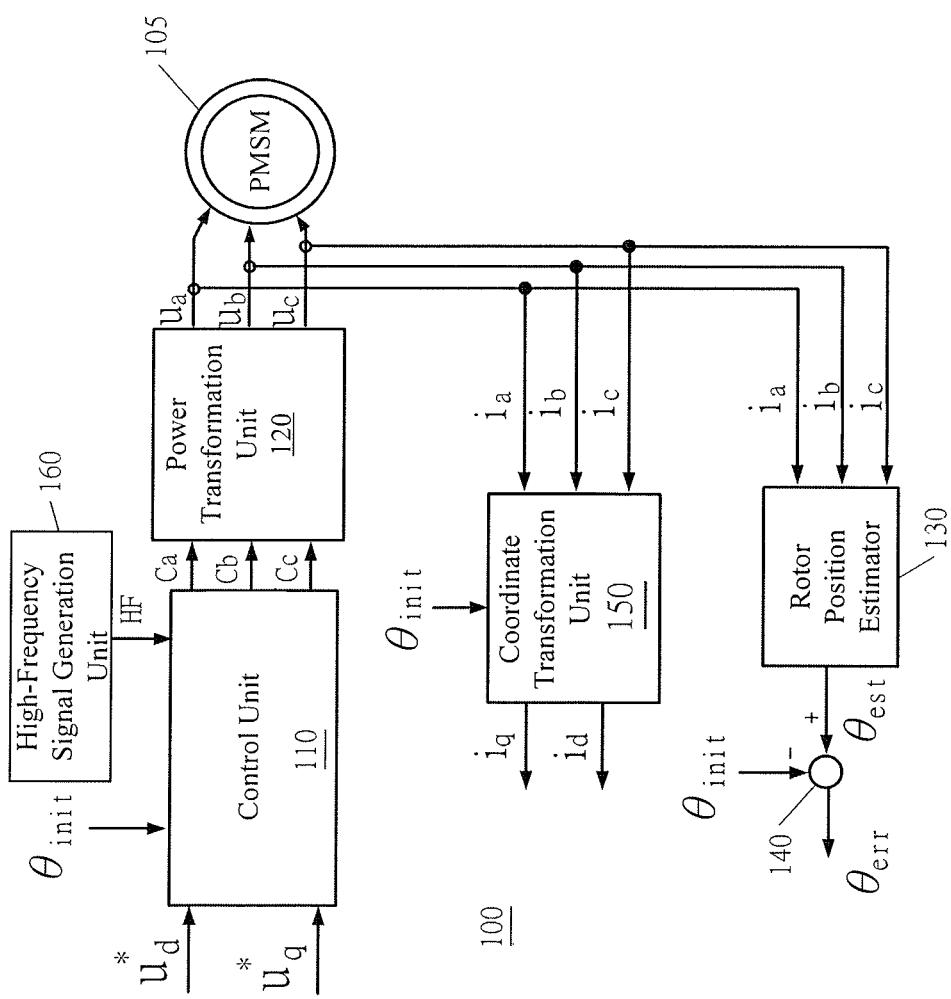
FIG. 1 is a schematic view of an apparatus for measuring a position deviation of a rotor of a permanent magnet synchronous motor (PMSM) according to an embodiment of the present disclosure.

FIG. 1 is a schematic view of an apparatus for measuring a position deviation of a rotor of a permanent magnet synchronous motor (PMSM) according to an embodiment of the present disclosure. As shown in FIG. 1, a measuring apparatus 100 mainly includes a control unit 110, a power transformation unit 120, a rotor position estimator 130 and a calculation unit 140. The control unit 110 is configured for receiving a d-axis DC voltage signal $u_d^*$ and a q-axis AC voltage signal $u_q^*$ of a rotary coordinate system (d-q axes) and configured for receiving an initial value $\theta_{init}$ of the rotor position and a high-frequency signal HF to output a three-phase command signal (including command signals Ca, Cb and Cc). In one embodiment, the initial value $\theta_{init}$ of the rotor position is regarded as the d-axis direction, and a d-axis DC voltage signal $u_d^*$ is given on the d-axis to lock a rotor axis. The control unit 110 converts the d-axis DC voltage signal $u_d^*$ and the q-axis AC voltage signal $u_q^*$ to a three-phase command signal according to the initial value $\theta_{init}$ of the rotor position and the high-frequency signal HF and then outputs the three-phase command signal.

Moreover, the power transformation unit 120 is electrically coupled to the control unit 110 and configured for receiving the aforementioned three-phase command signal and outputting a three-phase control signal (including control signals $u_a$, $u_b$ and $u_c$) for controlling the permanent magnet synchronous motor (PMSM) 105. The rotor position estimator 130 is electrically coupled to the permanent magnet synchronous motor 105 and configured for receiving a three-phase current feedback signal corresponding to an operation of the permanent magnet synchronous motor 105 (e.g., current feedback signals $i_a$, $i_b$ and $i_c$) and accordingly generate an estimation value $\theta_{est}$ of the rotor position. Furthermore, the calculation unit 140 is electrically coupled to the rotor position estimator 130 and configured for performing calculation to the initial value $\theta_{init}$ of the rotor position and the estimation value $\theta_{est}$ of the rotor position (for example, subtracting the initial value $\theta_{init}$ from the estimation value $\theta_{est}$) to generate a deviation value $\theta_{err}$ of the rotor position.

Since the prior art should use an additional device (e.g., a mechanical contracting brake device) to lock the motor so as to keep the motor in a standby state for convenience in measuring an angle or a position deviation of the rotor of the motor, operation problems such as inconvenience in usage and poor efficiency are caused, resulting in the condition of limiting the measuring method and reduces the flexibility in usage.

Compared with the prior art, in the embodiments of the present disclosure, the initial value of the rotor position (or any predetermined value) is mainly regarded as the d-axis direction, and a constant DC signal is given on the d-axis to lock the rotor axis, and an AC signal is injected to the q-axis to simulate a saturation state of the permanent magnet synchronous motor, and then the estimation value of the rotor position is obtained through a corresponding position estimator according to the current feedback signal of the operation of the motor, so as to acquire the deviation value of the rotor position. As such, during the entire process of measuring position (or angle) compensation values, the motor can be kept in a standby state without any additional device (e.g., the mechanical contracting brake device).

In one embodiment, a level of the d-axis DC voltage signal $u_d^*$ is greater than zero, so that corresponding three-phase control signals (including control signals $u_a$, $u_b$ and $u_c$) are generated accordingly, so as to lock the rotor axis of the permanent magnet synchronous motor 105.

Figure 2:
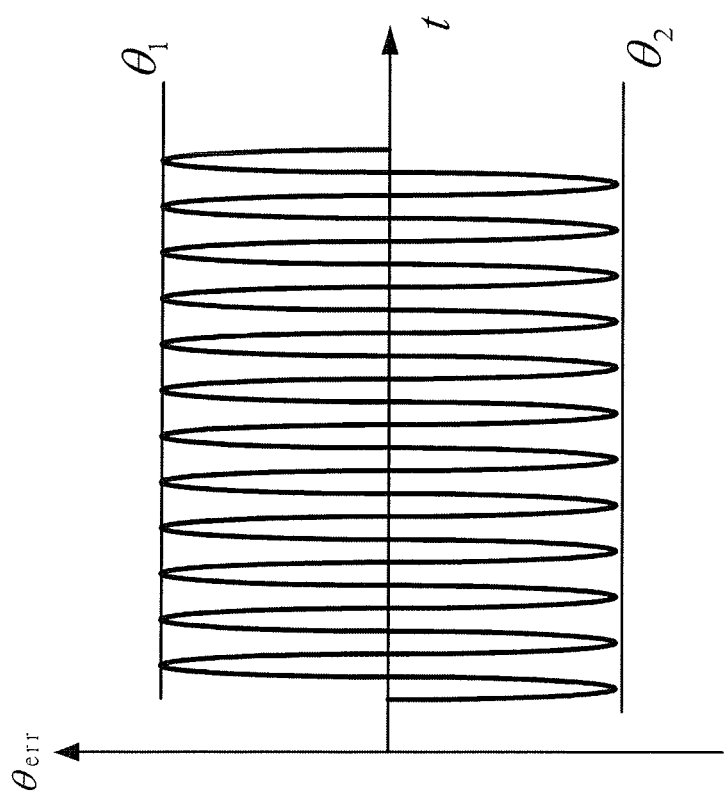
FIG. 2 is a schematic waveform diagram of the position deviation of a rotor during a measuring process according to an embodiment of the present disclosure.

Furthermore, FIG. 2 is a schematic waveform diagram of the position deviation of a rotor during a measuring process according to an embodiment of the present disclosure. As shown in FIG. 2, $\theta_1$ and $\theta_2$ are respectively the maximum compensation value and the minimum compensation value of the position (or angle) deviation, and are respectively the maximum positive value and the maximum negative value corresponding to the q-axis AC voltage signal $u_q^*$. As such, after the q-axis AC voltage signal $u_q^*$ is given, an amplitude value and the position (or angle) deviation corresponding thereto can be obtained according to the maximum compensation value $\theta_1$ and the minimum compensation value $\theta_2$ of the position (or angle) deviation.

In practice, the q-axis AC voltage signal $u_q^*$ may be a sine wave signal, a triangular wave signal, a square wave signal, a trapezoidal wave signal or AC signals of other types. Additionally, according to the procedure for measuring the position (or angle) deviation of the rotor of the motor through different injection manners (e.g., rotating injection, pulsating injection, pulse width modulation injection and the like), the high-frequency signal HF may also be the sine wave signal, the triangular wave signal, the square wave signal, the trapezoidal wave signal or high-frequency AC signals of other corresponding types. That is, those skilled in the art can select an appropriate AC signal as the q-axis AC voltage signal $u_q^*$ or the high-frequency signal HF, and the present disclosure is not limited to the AC signals of the aforementioned types.

Moreover, the frequency of the q-axis AC voltage signal $u_q^*$ may range between one-tenth of the rated frequency of the permanent magnet synchronous motor 105 and four times of the rated frequency of the permanent magnet synchronous motor 105, and more preferably the frequency of the q-axis AC voltage signal $u_q^*$ may be set as a half of the frequency of the q-axis AC voltage signal $u_q^*$.

Furthermore, the power transformation unit 120 may be a voltage source inverter, or other components or apparatus capable of transforming the three-phase command signals Ca, Cb and Cc to the three-phase control signals $u_a$, $u_b$ and $u_c$.

It should be noted that the aforementioned and the following values of the rotor position can represent the actual position of the rotor, or represent the angle of the rotor relative to an axis, and the current position of the rotor is represented by the angle, which are exemplary descriptions and not intended to limit the present disclosure.

Furthermore, the aforementioned initial value $\theta_{init}$ of the rotor position is first acquired through detection, and then the initial value $\theta_{init}$ of the rotor position is regarded as the d-axis direction. The d-axis DC voltage signal $u_d^*$ is given in the d-axis direction or alternatively any position or angle (e.g., a predetermined angle 0°) to rotate the permanent magnet synchronous motor 105 from an unknown position to the predetermined angle so as to make a rotation less than 180° thereof, and then the predetermined angle is regarded as the initial value of the rotor position and meanwhile regarded as the d-axis direction after the rotor axis is locked.

In one embodiment, as shown in FIG. 1, in a process for detecting the initial position of the rotor, in the condition of the d-axis DC voltage signal $u_d^*$ and the q-axis AC voltage signal $u_q^*$ being both zero (i.e. the control unit 110 receives the high-frequency signal HF, rather than the d-axis DC voltage signal $u_d^*$ and the q-axis AC voltage signal $u_q^*$), the estimation value $\theta_{est}$ of the rotor position outputted by the rotor position estimator 130 accordingly is regarded as the initial value of the rotor position $\theta_{init}$ directly inputted into the control unit 110.

In another embodiment, as shown in FIG. 1, the measuring apparatus 100 may further include a coordinate transformation unit 150. The coordinate transformation unit 150 is configured for receiving the initial value $\theta_{est}$ of the rotor position and the three-phase current feedback signal (i.e., signals $i_a$, $i_b$ and $i_c$) and accordingly configured for outputting a d-axis current feedback signal $i_d$ and a q-axis current feedback signal $i_q$, corresponding to the deviation value $\theta_{err}$ of the rotor position, wherein the aforementioned d-axis current feedback signal $i_d$ and q-axis current feedback signal $i_q$ are current signals.

In practice, the coordinate transformation unit 150 may be a three-phase to two-phase and a stationary-to-rotary coordinate transformation unit, wherein the three-phase (a-b-c) to two-phase (α-β) coordinate transformation is known as the "Clarke transformation" of the art, and the stationary (α-β) to rotary (d-q) coordinate transformation is known as the "Park transformation" of the art. In other words, the coordinate transformation unit 150 may be a Clarke-Park transformation unit for transforming the three-phase current feedback signals $i_a$, $i_b$ and $i_c$ to the d-axis current feedback signal $i_d$ and the q-axis current feedback signal $i_q$ of a rotary coordinate system.

In a further embodiment, as shown in FIG. 1, the measuring apparatus 100 may further include a high-frequency signal generation unit 160 for generating high-frequency signals HF corresponding to different injection manners (e.g., rotating injection, pulsating injection, pulse width modulation injection and the like).

Figure 3:
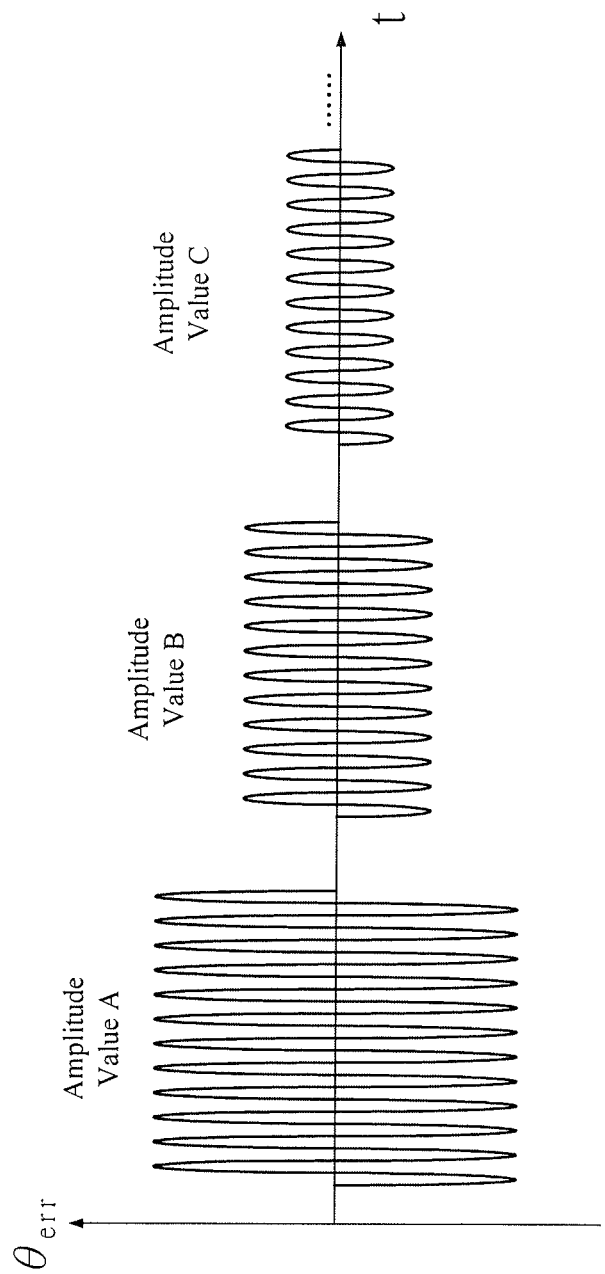
FIG. 3 is a schematic waveform diagram of the position deviation of a rotor based on different q-axis AC signals according to an embodiment of the present disclosure.

Additionally, the aforementioned q-axis AC voltage signal $u_q^*$ may be an AC voltage signal with variable amplitudes. FIG. 3 is a schematic waveform diagram of the position deviation of a rotor based on different q-axis AC signals according to an embodiment of the present disclosure. As shown in FIG. 3, in the condition of the q-axis AC signals having different amplitudes (e.g., the amplitude values A, B and C), the position deviation of the rotor can be respectively measured to obtain the deviation values of the rotor position with different q-axis AC signals. As such, different deviation values of the rotor position corresponding to different saturation states can be obtained by injecting a DC signal with a certain amplitude to the d axis and respectively injecting AC given signals with different amplitudes to the q axis.

Moreover, the aforementioned d-axis DC voltage signal $u_d^*$ may also be a DC voltage signal with variable amplitudes. Accordingly, when DC signals with a certain amplitude are injected to the d axis, a set of deviation values of the rotor position corresponding to different AC preset signals on the q axis can be obtained, and when DC signals with another certain amplitude are injected to the d axis, another set of deviation values of the rotor position corresponding to different AC given signals on the q axis can be obtained.

Figure 4:
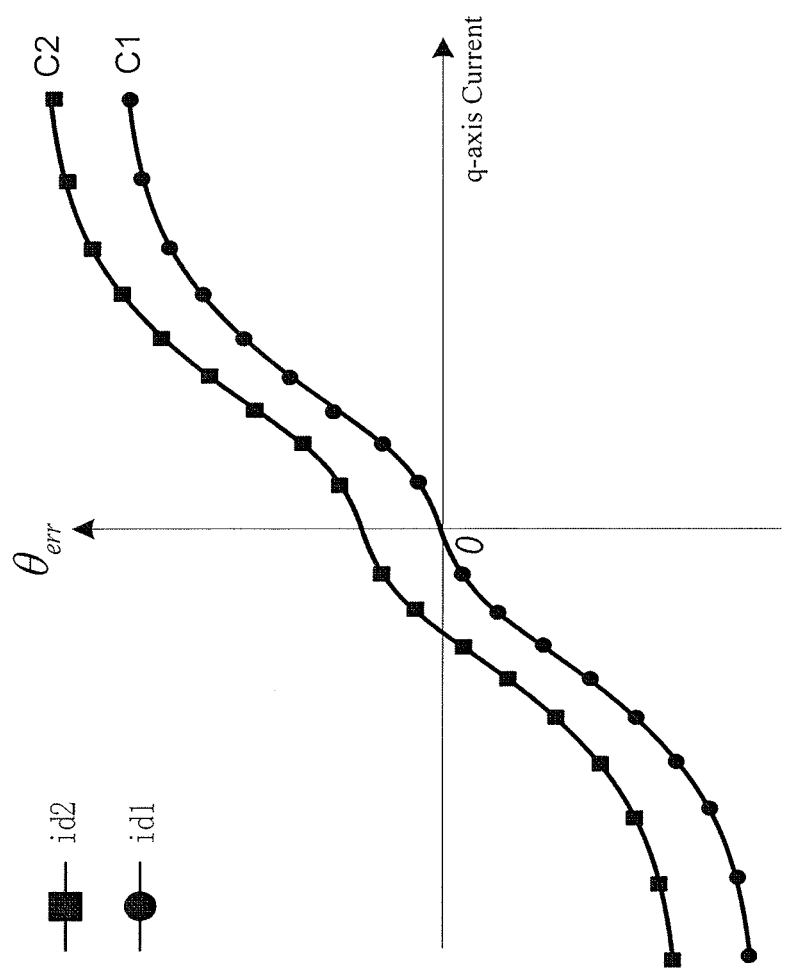
FIG. 4 is a schematic view of a position deviation fitting curve according to an embodiment of the present disclosure.

For example, FIG. 4 is a schematic view of a position deviation fitting curve according to an embodiment of the present disclosure, wherein the curve C1 represents that DC signals with an amplitude id1 injected to the d axis, and the curve C2 represents that DC signals with an amplitude id2 injected to the d axis. Specifically, when the aforementioned d-axis DC voltage signal $u_d^*$ is maintained constant, the angle deviation values of the rotor corresponding to different q-axis AC voltage signals $u_q^*$ can be fitted to form a continuous curve. As shown in FIG. 4, when DC signals with the amplitude id1 are injected to the d axis, plural discrete deviation values of the rotor position corresponding to different given AC signals on the q axis can be obtained, and these deviation values of the rotor position can be linearly fitted to form a deviation curve C1; and similarly when DC signals with the amplitude id2 are injected to the d axis, plural discrete deviation values of the rotor position corresponding to different given AC signals on the q axis can be obtained, and these deviation values of the rotor position can be linearly fitted to form a deviation curve C2. As such, plural DC signals with different amplitudes can be injected to the d axis, and accordingly plural AC signals with different amplitudes can be injected to the q axis, so as to obtain plural deviation curves, which facilitates the subsequent relations to the predetermined d-axis DC signal and q-axis AC signal, which is convenient for obtaining the corresponding deviation values of position (or angle), thereby realizing corresponding position (or angle) compensations. In other words, the d-axis DC voltage signal $u_d^*$ with different amplitudes, the q-axis AC voltage signal $u_q^*$ with different amplitudes and the deviation values of rotor angle corresponding thereto all can form a corresponding three-dimensional data lookup table.

Figure 5:
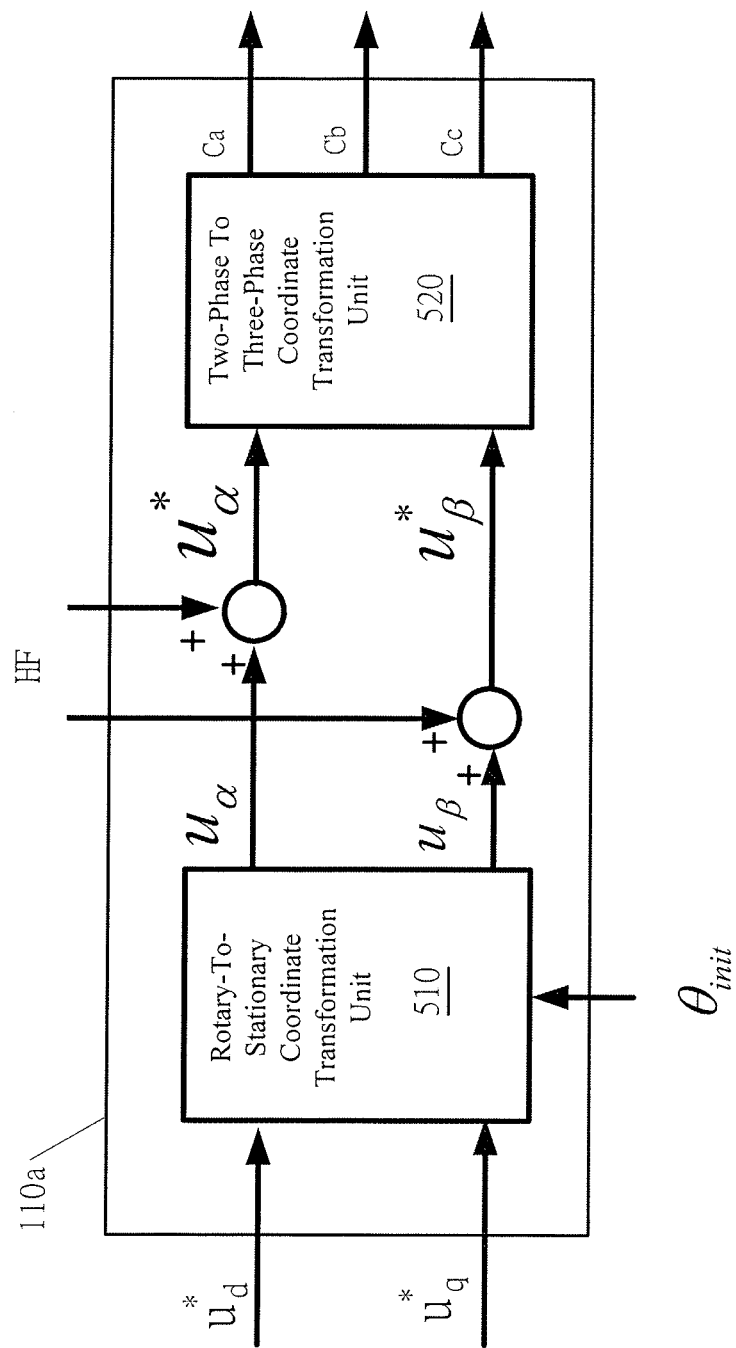
FIG. 5 is a schematic view of a control unit shown in FIG. 1 according to an embodiment of the present disclosure.

FIG. 5 is a schematic view of a control unit shown in FIG. 1 according to an embodiment of the present disclosure. As shown in FIG. 5, the control unit 110a may further include a rotary-to-stationary coordinate transformation unit 510 and a two-phase to three-phase coordinate transformation unit 520, wherein similar to the meanings of the aforementioned "Clarke transformation" and the "Park transformation", the rotary-to-stationary coordinate transformation unit 510 may be known as the "inverse Park transformation unit" of the art, and the two-phase to three-phase coordinate transformation unit 520 may be known as the "inverse Clarke transformation unit" of the art.

The rotary-to-stationary coordinate transformation unit 510 is configured for receiving the d-axis DC voltage signal $u_d^*$, the q-axis AC voltage signal $u_q^*$ and the initial value $\theta_{init}$ of the rotor position and outputs the α-axis voltage signal $u_\alpha$ and the β-axis voltage signal $u_\beta$ of the stationary coordinate system (α-β axes). The two-phase to three-phase coordinate transformation unit 520 is configured for receiving the α-axis adjusting signal $u_\alpha^*$ and the β-axis adjusting signal $U_\beta^*$ obtained respectively by superimposing the α-axis voltage signal $u_\alpha$ and the β-axis voltage signal $u_\beta$ with the high-frequency signal HF and outputs the three-phase command signals Ca, Cb and Cc.

Figure 6:
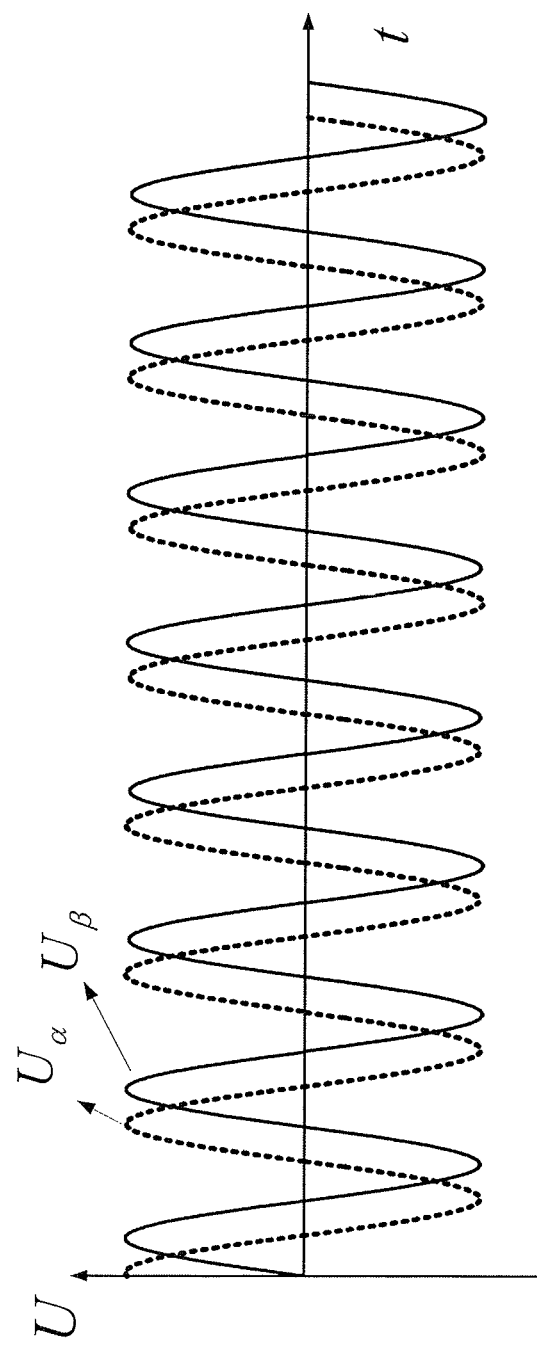
FIG. 6 is a schematic waveform diagram of a rotating high-frequency AC signal according to an embodiment of the present disclosure.

In this embodiment, the control unit 110a can be applied in a measurement of the position deviation of the rotor of the motor, which is operated according to a rotating injection manner, and the high-frequency signal HF may be a three-phase symmetric rotating high-frequency AC signal. FIG. 6 is a schematic waveform diagram of a rotating high-frequency AC signal according to an embodiment of the present disclosure, wherein the signals $U_\alpha$ and $U_\beta$ respectively represent the rotating high-frequency AC signals on the a axis and the β axis, and the rotating high-frequency AC signal may be a sine wave signal, a triangular wave signal, a square wave signal, a trapezoidal wave signal or AC signals of other types.

The aforementioned three-phase symmetric rotating high-frequency AC signal is respectively superimposed with the α-axis voltage signal $u_\alpha$ and the β-axis voltage signal $u_\beta$ (e.g., forming the α-axis adjusting signal $u_\alpha^*$ and the β-axis adjusting signal $u_\beta^*$) and then injected into the two-phase to three-phase coordinate transformation unit 520, and subsequently the two-phase to three-phase coordinate transformation unit 520 transforms the adjusting signals $u_\alpha^*$ and $u_\beta^*$ to the three-phase command signals Ca, Cb and Cc. Furthermore, since the control unit 110a can be applied in a measurement of the position deviation of the rotor of the motor, which is operated according to the rotating injection manner, the rotor position estimator 130 shown in FIG. 1 can accordingly be a rotating injection estimator.

Figure 7:
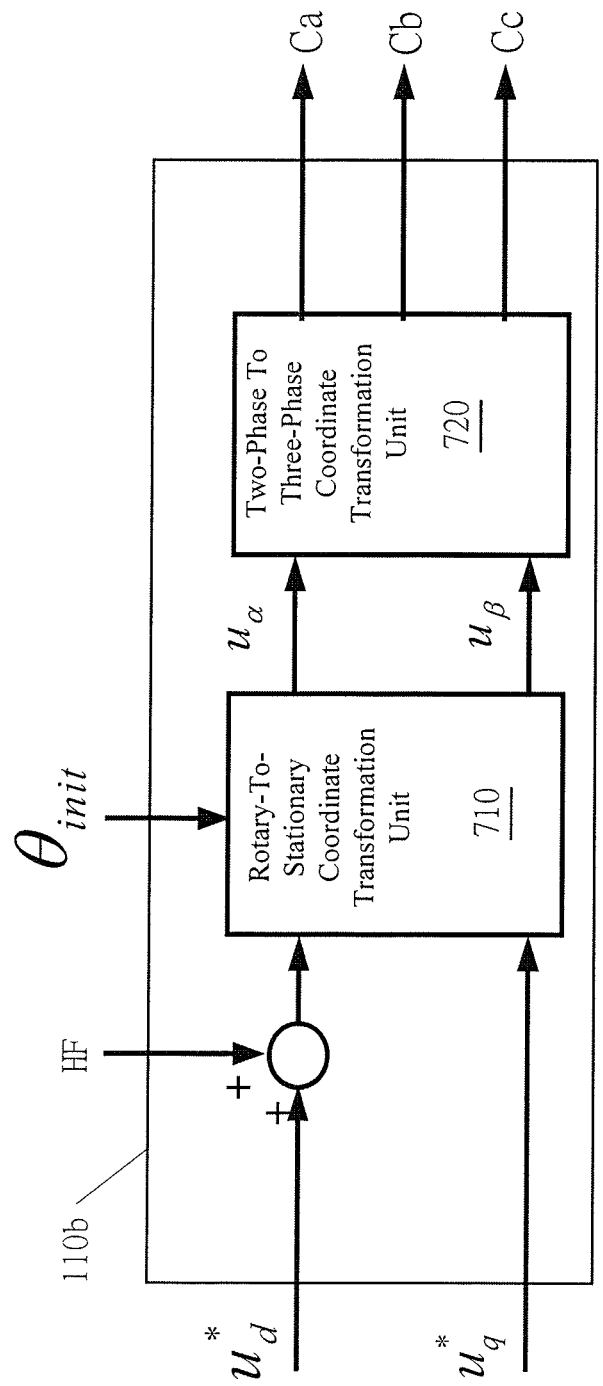
FIG. 7 is a schematic view of the control unit shown in FIG. 1 according to another embodiment of the present disclosure.

FIG. 7 is a schematic view of the control unit shown in FIG. 1 according to another embodiment of the present disclosure. As shown in FIG. 7, the control unit 110b may also include a rotary-to-stationary coordinate transformation unit 710 and a two-phase to three-phase coordinate transformation unit 720. The rotary-to-stationary coordinate transformation unit 710 is configured for receiving a signal obtained by superimposing the d-axis DC voltage signal $u_d^*$ with the high-frequency signal HF, the q-axis AC voltage signal $u_q^*$ and the initial value of the rotor position $\theta_{init}$ and configured for outputting an α-axis voltage signal $u_\alpha$ and a β-axis voltage signal $u_\beta$ of the stationary coordinate system (α-β axes). The two-phase to three-phase coordinate transformation unit 720 is configured for receiving the α-axis voltage signal $u_\alpha$ and the β-axis voltage signal $u_\beta$, and outputs the three-phase command signals Ca, Cb and Cc.

Figure 8:
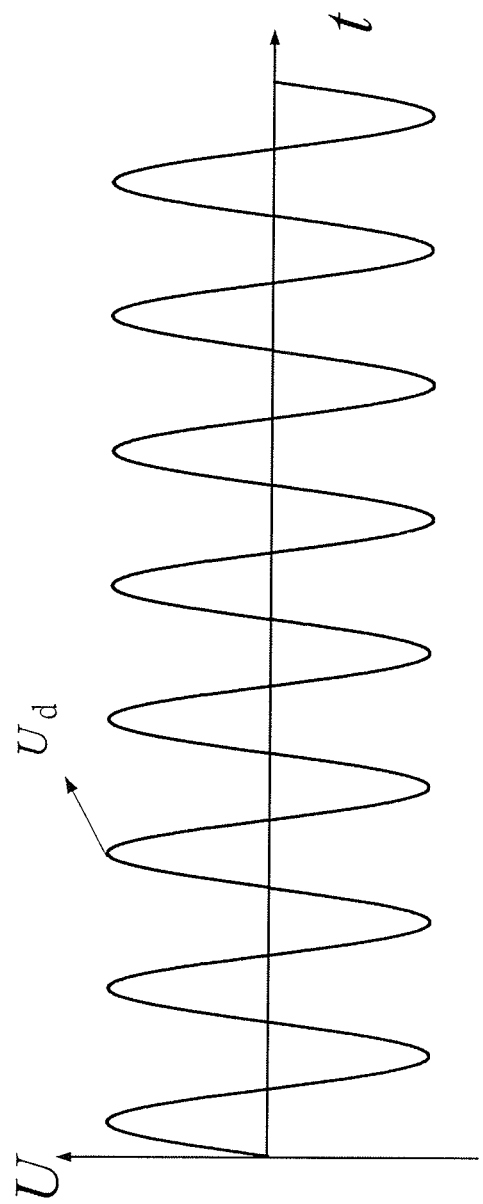
FIG. 8 is a schematic waveform diagram of a pulsating high-frequency AC signal according to an embodiment of the present disclosure.

In this embodiment, the control unit 110b can be applied in a measurement of the position deviation of the rotor of the motor, which is operated according to a pulsating injection manner, and the high-frequency signal HF may be a pulsating high-frequency AC signal. FIG. 8 is a schematic waveform diagram of a pulsating high-frequency AC signal according to an embodiment of the present disclosure, wherein the signal $u_d$ represents the pulsating high-frequency AC signal on the d axis, and the pulsating high-frequency AC signal may be a sine wave signal, a triangular wave signal, a square wave signal, a trapezoidal wave signal or AC signals of other types.

The aforementioned pulsating high-frequency AC signal can be superimposed with the d-axis DC voltage signal $u_d^*$ on the d axis and then injected into the rotary-to-stationary coordinate transformation unit 710, and subsequently the rotary-to-stationary coordinate transformation unit 710 transforms the corresponding superimposed signal and the q-axis AC voltage signal $u_q^*$ to the α-axis voltage signal $u_\alpha$ and the β-axis voltage signal $u_\beta$. Furthermore, since the control unit 110b can be applied in a measurement of the position deviation of the rotor of the motor, which is operated according to the pulsating injection manner, the rotor position estimator 130 shown in FIG. 1 may accordingly be a pulsating injection estimator.

Figure 9:
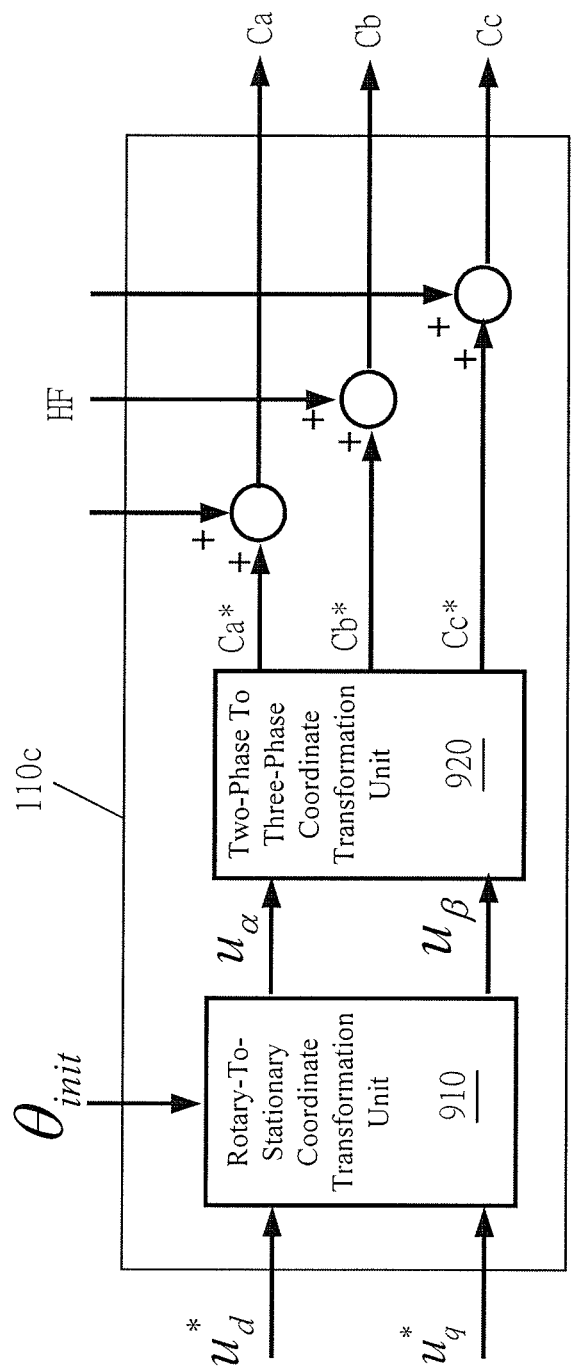
FIG. 9 is a schematic view of the control unit shown in FIG. 1 according to a further embodiment of the present disclosure.

FIG. 9 is a schematic view of the control unit shown in FIG. 1 according to a further embodiment of the present disclosure. As shown in FIG. 9, the control unit 110c may also include a rotary-to-stationary coordinate transformation unit 910 and a two-phase to three-phase coordinate transformation unit 920. The rotary-to-stationary coordinate transformation unit 910 is configured for receiving the d-axis DC voltage signal $u_d^*$, the q-axis AC voltage signal $u_q^*$ and the initial $\theta_{init}$ value of the rotor position and configured for outputting an α-axis voltage signal $u_\alpha$ and a β-axis voltage signal $u_\beta$ of the stationary coordinate system. The two-phase to three-phase coordinate transformation unit 920 is configured for receiving the α-axis voltage signal $u_\alpha$ and the β-axis voltage signal $u_\beta$ and configured for outputting the three-phase voltage signals Ca*, Cb* and Cc*.

In this embodiment, the control unit 110c can be applied in a measurement of the position deviation of the rotor of the motor, which is operated according to a pulse width modulation (PWM) injection manner, and the high-frequency signal HF may be a pulse width modulation signal. The pulse width modulation signal is superimposed with the three-phase voltage signals (e.g., the three-phase voltage signals Ca*, Cb* and Cc*) outputted by the two-phase to three-phase coordinate transformation unit 920 to form the three-phase command signals Ca, Cb and Cc to be injected to the aforementioned power transformation unit 120 shown in FIG. 1. Furthermore, the aforementioned three-phase command signals Ca*, Cb* and Cc* are superimposed with the pulse width modulation signal HF in a non-zero voltage vector direction to obtain the three-phase command signals Ca, Cb and Cc, and a voltage resultant vector of the pulse width modulation signal in one control cycle is zero. Moreover, since the control unit 110c can be applied in a measurement of the position deviation of the rotor of the motor, which is operated according to the PWM injection manner, the rotor position estimator 130 shown in FIG. 1 can accordingly be a PWM injection estimator.

Figure 10:
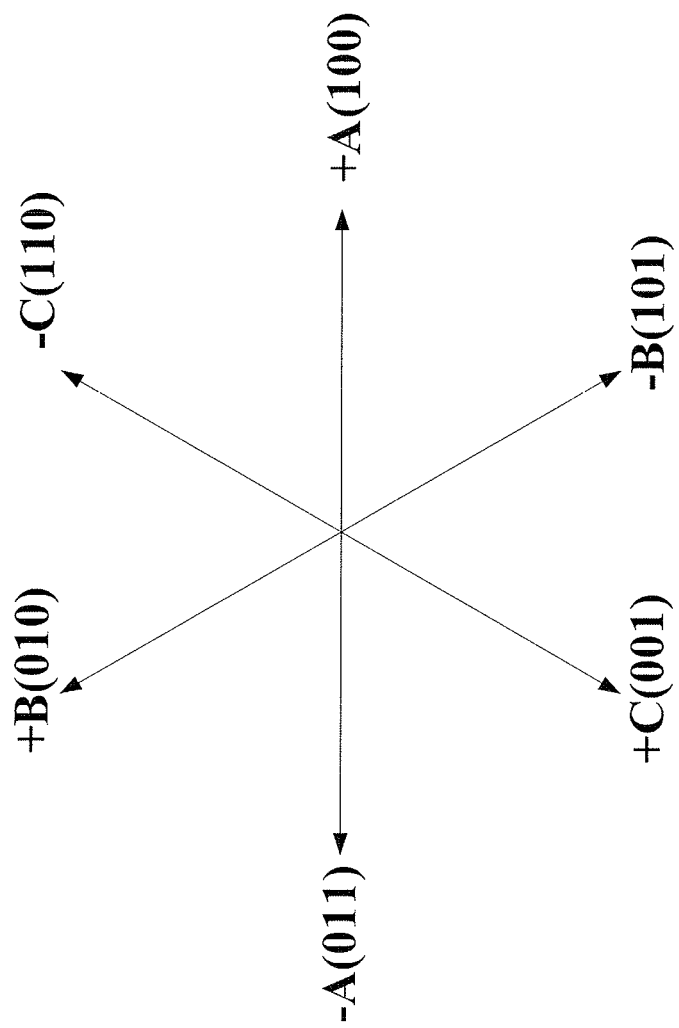
FIG. 10 is a schematic space vector diagram of the injection manner with a pulse width modulation signal according to an embodiment of the present disclosure.

FIG. 10 is a schematic space vector diagram of the injection manner with a pulse width modulation signal according to an embodiment of the present disclosure. As shown in FIG. 10, for example in the condition of the power transformation unit 120 shown in FIG. 1 being a two-level converter (including bridge arm switches corresponding to three phases A, B and C), assuming that the turn-on state of the upper bridge arm switches (e.g., IGBTs) corresponding to three phases A, B and C is regarded as "1" and the turn-off state thereof is regarded as "0", then when the upper bridge arm of phase A is turned on and the upper bridge arms of the phases B and C are turned off, the corresponding state is +A(100); in contrast, when the upper bridge arm of phase A is turned off and the upper bridge arms of the phases B and C are turned on, the corresponding state is −A(011); similarly, when the upper bridge arm of phase B is turned on and the upper bridge arms of the phases A and C are turned off, the corresponding state is +B(010); when the upper bridge arm of phase B is turned off and the upper bridge arms of the phases A and C are turned on, the corresponding state is −B(101); when the upper bridge arm of phase C is turned on and the upper bridge arms of the phases A and B are turned off, the corresponding state is +C(001); when the upper bridge arm of phase C is turned off and the upper bridge arms of the phases A and B are turned on, the corresponding state is −C(110); and when the upper bridge arms of the three phases are all turned on, the corresponding state is (111), and when the upper bridge arms of the three phases are all turned off, the corresponding state is (000). There are six non-zero voltage vectors and two zero voltage vectors in total. The aforementioned pulse width modulation signal is respectively superimposed with the three-phase voltage signals Ca*, Cb* and Cc* in a non-zero voltage vector direction and then injected into the power transformation unit 120 shown in FIG. 1. That is, the pulse width modulation signal HF is injected in each of the directions +A, +B, +C, −A, −B and −C.

Furthermore, in one control cycle, the voltage resultant vector of the aforementioned high-frequency signal (i.e., the pulse width modulation signal) is zero, such that the equivalent voltage vector after the injection of the high-frequency signal is equal to the equivalent voltage vector before the injection of the high-frequency signal. For example, in the condition of one control cycle being divided into three pulse width modulation (PWM) cycles, in the first PWM cycle, the pulse width modulation signal can be injected in the directions of +A and −A; in the second PWM cycle, the pulse width modulation signal can be injected in the directions of +B and −B; and in the third PWM cycle, the pulse width modulation signal can be injected in the directions of +C and −C.

Figure 11:
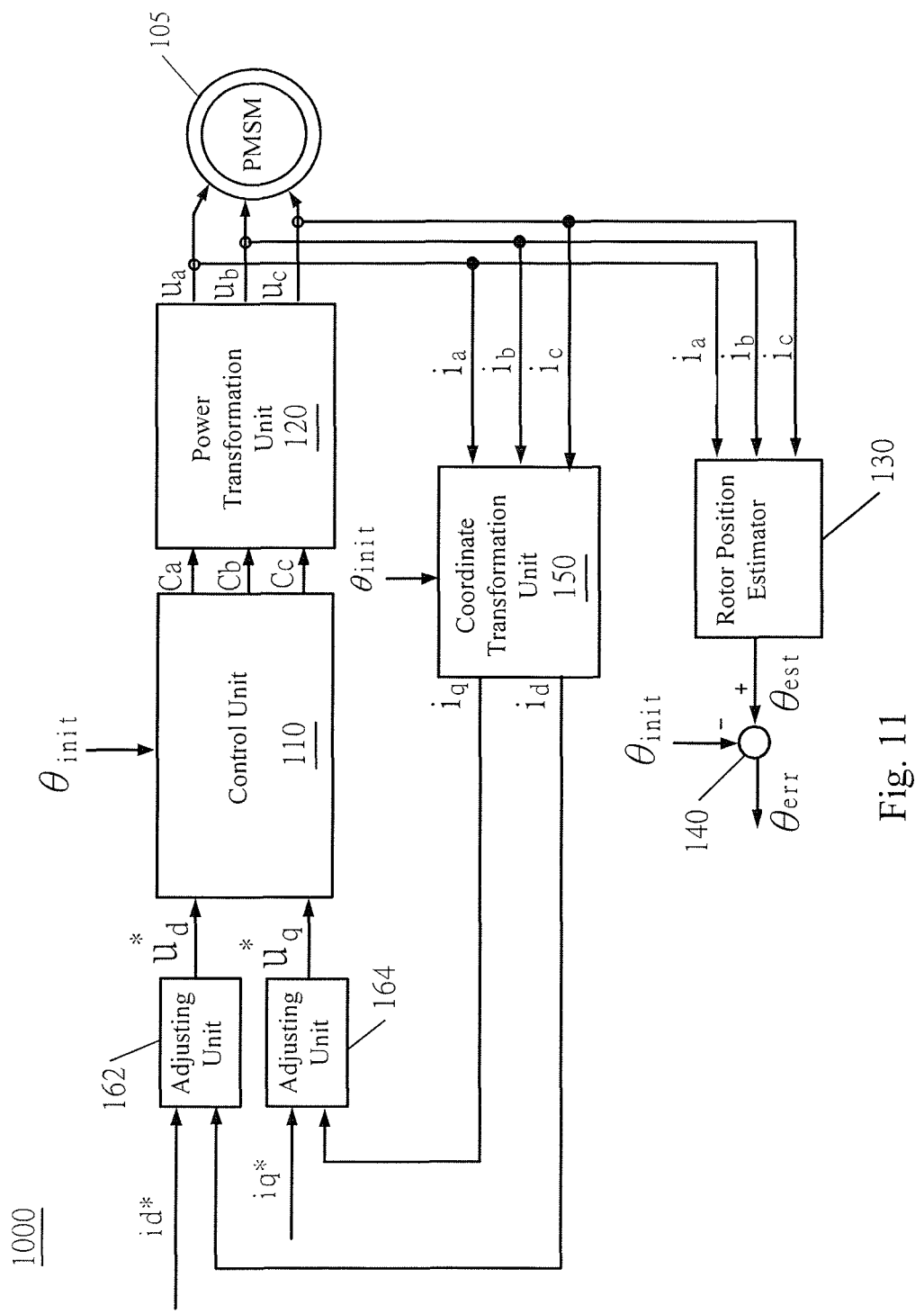
FIG. 11 is a schematic view of an apparatus for measuring the position deviation of a rotor of a motor according to another embodiment of the present disclosure.

FIG. 11 is a schematic view of an apparatus for measuring the position deviation of a rotor of a motor according to another embodiment of the present disclosure. Compared with FIG. 1, the measuring apparatus 1000 further includes two adjusting units 162 and 164. The adjusting unit 162 is electrically coupled to the control unit 110 and the coordinate transformation unit 150 and configured for receiving a d-axis DC current signal $i_d^*$ and the aforementioned d-axis current feedback signal $i_d$ and configured for accordingly outputting the d-axis DC voltage signal $u_d^*$ according to the d-axis DC current signal $i_d^*$ and the d-axis current feedback signal $i_d$. The adjusting unit 164 is electrically coupled to the control unit 110 and the coordinate transformation unit 150 and configured for receiving a q-axis AC current signal $i_q^*$ and the aforementioned q-axis current feedback signal $i_q$ and configured for accordingly outputting the q-axis AC voltage signal $u_q^*$ according to the q-axis AC current signal $i_q^*$ and the q-axis current feedback signal $i_q$.

In an embodiment, the adjusting units 162 and 164 may be a proportional-integral-differential (PID) adjuster, a bang-bang adjuster or other adjuster capable of outputting the required signals correspondingly. In an embodiment, the adjusting units 162 and 164 may be integrated in a single adjusting apparatus, to respectively output the d-axis DC voltage signal $u_d^*$ and the q-axis AC voltage signal $u_q^*$ through two adjusting channels of the adjusting apparatus.

Another aspect of the present disclosure provides a method for measuring position deviation of a rotor of a motor, which can be applied to the above embodiments, but the present disclosure is not limited to those. In order to illustrate clearly and definitely, the following description with respect to the method for measuring a position deviation of the rotor of the motor can be illustrated with references to the aforementioned apparatus for measuring a position deviation of the rotor of the motor (such as the embodiments shown in FIGS. 1, 5, 7, 9 and 11), but the present disclosure are not limited to those.

Figure 12:
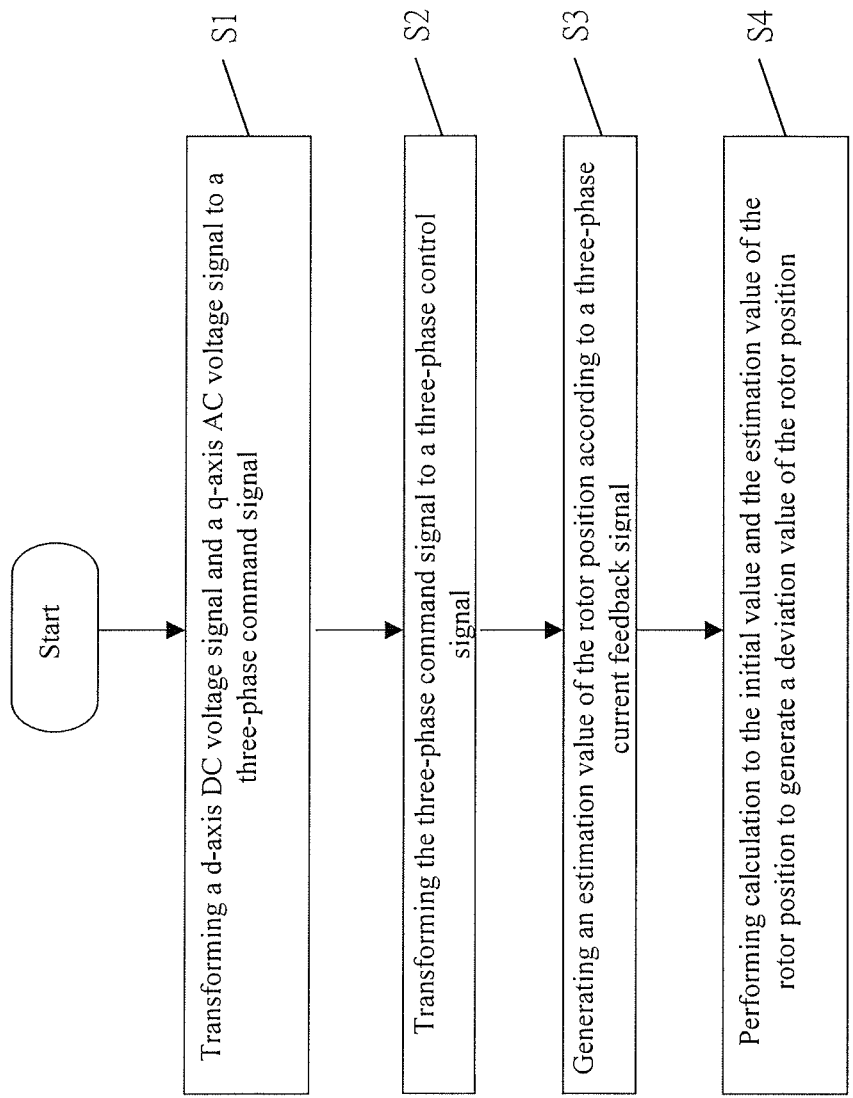
FIG. 12 is a flow chart of a method for measuring the position deviation of a rotor of a motor according to an embodiment of the present disclosure.

FIG. 12 is a flow chart of a method for measuring the position deviation of a rotor of a motor according to an embodiment of the present disclosure. As shown in FIGS. 1 and 12, first a d-axis DC voltage signal $u_d^*$ and a q-axis AC voltage signal $u_q^*$ of the rotary coordinate system (d-q axes) is transformed to a three-phase command signal (including command signals Ca, Cb and Cc) according to an initial value $\theta_{init}$ of the rotor position and a high-frequency signal HF (step S1). Then, the three-phase command signal is transformed to a three-phase control signal (including three-phase control signals $u_a$, $u_b$ and $u_c$) for controlling the motor (such as a permanent magnet synchronous motor 105) (step S2). Subsequently, an estimation value of the rotor position $\theta_{est}$ is generated according to a three-phase current feedback signal (including current feedback signals $i_a$, $i_b$ and $i_c$) corresponding to an operation of the motor (step S3). Thereafter, calculation is performed to the initial value $\theta_{init}$ of the rotor position and the estimation value $\theta_{est}$ of the rotor position (e.g., subtracting the initial value $\theta_{init}$ from the estimation value $\theta_{est}$) to generate a deviation value of the rotor position $\theta_{err}$ (step S4).

Furthermore, also referring to FIG. 5, the aforementioned step S1 further includes: the d-axis DC voltage signal $u_d^*$ and the q-axis AC voltage signal $u_q^*$ are transformed to an α-axis voltage signal $u_\alpha$ and a β-axis voltage signal $u_\beta$ of a stationary coordinate system through the rotary-to-stationary coordinate transformation unit 510, and the α-axis adjusting signal $u_\alpha^*$ and the β-axis adjusting signal $u_\beta^*$ obtained by respectively superimposing the α-axis voltage signal $u_\alpha$ and the β-axis voltage signal $u_\beta$ with a three-phase symmetric rotating high-frequency AC signal are transformed to three-phase command signals Ca, Cb and Cc through the two-phase to three-phase coordinate transformation unit 520.

Moreover, also referring to FIG. 7, in another embodiment, the aforementioned high-frequency signal HF may be a pulsating high-frequency AC signal, and the aforementioned step S1 may further include the steps below. The signal obtained by superimposing the pulsating high-frequency AC signal HF with the d-axis DC voltage signal $u_d^*$ and the q-axis AC voltage signal $u_q^*$ are transformed to an α-axis voltage signal $u_\alpha$ and a β-axis voltage signal $u_\beta$ of a stationary coordinate system through the rotary-to-stationary coordinate transformation unit 710; and the α-axis voltage signal $u_\alpha$ and the β-axis voltage signal $u_\beta$ are transformed to the three-phase command signals Ca, Cb and Cc through the two-phase to three-phase coordinate transformation unit 720.

Also, referring to FIG. 9, in a further embodiment, the aforementioned high-frequency signal HF may be a pulse width modulation signal, and the aforementioned step S1 may further include the steps below. The d-axis DC voltage signal $u_d^*$ and the q-axis AC voltage signal $u_q^*$ are transformed to the α-axis voltage signal $u_\alpha$ and the β-axis voltage signal $u_\beta$ of a stationary coordinate system through the rotary-to-stationary coordinate transformation unit 910; the α-axis voltage signal $u_\alpha$ and the β-axis voltage signal $u_\beta$ are transformed to three-phase voltage signals Ca*, Cb* and Cc* through the two-phase to three-phase coordinate transformation unit 920; and the three-phase voltage signals Ca*, Cb* and Cc* are superimposed with a pulse width modulation signal HF in a non-zero voltage vector direction to obtain the three-phase command signals Ca, Cb and Cc, wherein in one control cycle, a voltage resultant vector of the aforementioned pulse width modulation signal HF is zero.

In the aforementioned step S2, the step of transforming the three-phase command signal into the three-phase control signal can be implemented through a two-level converter, and the present disclosure is not limited to this.

Furthermore, as shown in FIGS. 1 and 12, the aforementioned method for measuring a position deviation of the rotor of the motor may further include the steps below. The three-phase current feedback signal (including the current feedback signals $i_a$, $i_b$ and $i_c$) is transformed to the d-axis current feedback signal $i_d$ and q-axis current feedback signal $i_q$ according to the initial value $\theta_{init}$ of the rotor position through the coordinate transformation unit 150, which correspond to the deviation value $\theta_{err}$ of the rotor position, wherein the d-axis current feedback signal $i_d$ and the q-axis current feedback signal $i_q$ are both current signals.

Furthermore, also referring to FIG. 11, the aforementioned measuring method may further include the steps below. The d-axis DC current signal $i_d^*$ is transformed to the d-axis DC voltage signal $u_d^*$ according to the d-axis current feedback signal $i_d$, and the q-axis AC current signal $i_q^*$ is transformed to the q-axis AC voltage signal $u_q^*$ according to the q-axis current feedback signal $i_q$. In an embodiment, the aforementioned d-axis current feedback signal $i_d$ and the aforementioned q-axis current feedback signal $i_q$ are both current signals.

In one embodiment, the level of the d-axis DC voltage signal $u_d^*$ is greater than zero, so that the corresponding three-phase control signals (including three-phase control signals $u_a$, $u_b$, and $u_c$) are generated accordingly, so as to lock the rotor axis of the permanent magnet synchronous motor 105.

In practice, the q-axis AC voltage signal $u_q^*$ may be a sine wave signal, a triangular wave signal, a square wave signal, a trapezoidal wave signal or AC signals of other types. Additionally, according to the procedure for measuring the position (or angle) deviation of the rotor of the motor through different injection manners (e.g., rotating injection, pulsating injection, pulse width modulation injection and the like), the high-frequency signal HF may also be the sine wave signal, the triangular wave signal, the square wave signal, the trapezoidal wave signal or high-frequency AC signals of other corresponding types. That is, those of skills in the art can select an appropriate AC signal as the q-axis AC voltage signal $u_q^*$ or the high-frequency signal HF, and the present disclosure is not limited to the AC signals of the aforementioned types.

Additionally, similar to the aforementioned description, in the detecting process of the initial position of the rotor, in the condition of the d-axis DC voltage signal $u_d^*$ and the q-axis AC voltage signal $u_q^*$ being both zero (i.e., the control unit 110 receives the high-frequency signal HF, rather than the signals $u_d^*$ and $u_q^*$), the generated estimation value $\theta_{est}$ of the rotor position can be regarded as the initial value $\theta_{init}$ of the rotor position. Furthermore, the aforementioned d-axis DC voltage signal $u_d^*$ may be a DC voltage signal with variable amplitudes, and the aforementioned q-axis AC voltage signal $u_q^*$ may be an AC voltage signal with variable amplitudes.

The sequence of the steps stated above can be adjusted according to actual demands, unless otherwise the sequence is stated definitely and partial or all of the steps can even be performed simultaneously. The flow chart shown in FIG. 12 is only used as an example, and is not intended to limit the present disclosure.

It can be seen from the embodiments of the present disclosure that, by utilizing the aforementioned apparatus and method for measuring position deviation of the rotor of the motor, during the entire measuring process of position (or angle) compensation values, the motor can be kept in a resting state without using any external device (e.g., the mechanical contracting brake apparatus), and also the measuring method becomes more convenient, and has better efficiency and flexibility. As such the time and cost for embodying the entire measuring process of position (or angle) compensation values can be reduced, which enables the method to be generally applicable to various application situations.

Although the present disclosure has been disclosed with reference to the above embodiments, these embodiments are not intended to limit the present disclosure. It will be apparent to those of skills in the art that various modifications and variations can be made without departing from the spirit and scope of the present disclosure. Therefore, the scope of the present disclosure shall be defined by the appended claims.

What is claimed is:

1. An apparatus for measuring a position deviation of a rotor of a permanent magnet synchronous motor (PMSM), comprising:
   a control unit configured for receiving a d-axis DC voltage signal and a q-axis AC voltage signal of a rotary coordinate system and configured for receiving an initial value of the rotor position and a high-frequency signal to output a three-phase command signal;
   a power transformation unit configured for receiving the three-phase command signal and outputting a three-phase control signal for controlling the motor;
   a rotor position estimator configured for receiving a three-phase current feedback signal corresponding to an operation of the motor and generating an estimation value of the rotor position; and
   a calculation unit configured for performing calculation to the initial value and the estimation value of the rotor position to generate a deviation value of the rotor position.

2. The apparatus of claim 1, wherein the control unit further comprises:
   a rotary-to-stationary coordinate transformation unit configured for receiving the d-axis DC voltage signal, the q-axis AC voltage signal and the initial value of the rotor position and configured for outputting an α-axis voltage signal and a β-axis voltage signal of a stationary coordinate system; and
   a two-phase to three-phase coordinate transformation unit configured for receiving an α-axis adjusting signal and a β-axis adjusting signal obtained by respectively superimposing the α-axis voltage signal and the β-axis voltage signal with a three-phase symmetric rotating high-frequency AC signal and outputting the three-phase command signal.

3. The apparatus of claim 1, wherein the control unit further comprises:
   a rotary-to-stationary coordinate transformation unit configured for receiving a signal obtained by superimposing the d-axis DC voltage signal with a pulsating high-frequency AC signal, the q-axis AC voltage signal and the initial value of the rotor position and outputting an α-axis voltage signal and a β-axis voltage signal of a stationary coordinate system; and
   a two-phase to three-phase coordinate transformation unit configured for receiving the α-axis voltage signal and the β-axis voltage signal and outputting the three-phase command signal.

4. The apparatus of claim 1, wherein the control unit further comprises:
   a rotary-to-stationary coordinate transformation unit configured for receiving the d-axis DC voltage signal, the q-axis AC voltage signal and the initial value of the rotor position and outputting an α-axis voltage signal and a β-axis voltage signal of a stationary coordinate system; and
   a two-phase to three-phase coordinate transformation unit configured for receiving the α-axis voltage signal and the β-axis voltage signal and outputting a three-phase voltage signal;
   wherein the three-phase voltage signal is superimposed with a pulse width modulation signal in a non-zero voltage vector direction to obtain the three-phase command signal, and a voltage resultant vector of the pulse width modulation signal in one control cycle is zero.

5. The apparatus of claim 1, wherein the power transformation unit is a two-level converter.

6. The apparatus of claim 5, wherein the power transformation unit is a voltage source inverter.

7. The apparatus of claim 1, wherein the rotor position estimator is one of a rotating injection estimator, a pulsating injection estimator and a pulse width modulation injection estimator.

8. The apparatus of claim 1, further comprising:
a coordinate transformation unit configured for receiving the initial value of the rotor position and the three-phase current feedback signal, and outputting a d-axis current feedback signal and a q-axis current feedback signal.

9. The apparatus of claim 8, further comprising:
a first adjusting unit configured for receiving a d-axis DC current signal and the d-axis current feedback signal, and outputting the d-axis DC voltage signal; and
a second adjusting unit configured for receiving a q-axis AC current signal and the q-axis current feedback signal, and outputting the q-axis AC voltage signal.

10. The apparatus of claim 1, wherein the estimation value of the rotor position outputted by the rotor position estimator is the initial value of the rotor position when both the d-axis DC voltage signal and the q-axis AC voltage signal are zero.

11. The apparatus of claim 1, wherein the q-axis AC voltage signal or the high-frequency signal is a sine wave signal, a triangular wave signal, a square wave signal or a trapezoidal wave signal.

12. The apparatus of claim 11, wherein a frequency of the q-axis AC voltage signal ranges between one-tenth of a rated frequency and four times of the rated frequency of the PMSM.

13. The apparatus of claim 12, wherein the frequency of the q-axis AC voltage signal is a half of the rated frequency of the PMSM.

14. The apparatus of claim 1, wherein when the d-axis DC voltage signal is maintained constant, angle deviation values of the rotor corresponding to different q-axis AC voltage signals form a continuous curve.

15. The apparatus of claim 1, wherein angle deviation values of the rotor corresponding to the d-axis DC voltage signals with different amplitudes and the q-axis AC voltage signals with different amplitudes form a three-dimensional data lookup table.

16. The apparatus of claim 1, wherein a level of the d-axis DC voltage signal is greater than zero.

17. A method for measuring a position deviation of a rotor of a permanent magnet synchronous motor (PMSM), comprising:
transforming a d-axis DC voltage signal and a q-axis AC voltage signal of a rotary coordinate system to a three-phase command signal according to a initial value of the rotor position and a high-frequency signal;
transforming the three-phase command signal to a three-phase control signal for controlling the motor;
generating an estimation value of the rotor position according to a three-phase current feedback signal corresponding to an operation of the motor; and
performing calculation to the initial value and the estimation value of the rotor position to generate a deviation value of the rotor position.

18. The method of claim 17, wherein the step of transforming the d-axis DC voltage signal and the q-axis AC voltage signal to the three-phase command signal further comprises:
transforming the d-axis DC voltage signal and the q-axis AC voltage signal to an α-axis voltage signal and a β-axis voltage signal of a stationary coordinate system through a rotary-to-stationary coordinate transformation unit; and
transforming the α-axis adjusting signal and the β-axis adjusting signal obtained respectively by superimposing the α-axis voltage signal and the β-axis voltage signal with a three-phase symmetric rotating high-frequency AC signal to the three-phase command signal through a two-phase to three-phase coordinate transformation unit.

19. The method of claim 17, wherein the step of transforming the d-axis DC voltage signal and the q-axis AC voltage signal to the three-phase command signal further comprises:
transforming the q-axis AC voltage signal and the signal obtained by superimposing the d-axis DC voltage signal with a pulsating high-frequency AC signal to an α-axis voltage signal and a β-axis voltage signal of a stationary coordinate system through a rotary-to-stationary coordinate transformation unit; and
transforming the α-axis voltage signal and the β-axis voltage signal to the three-phase command signal through a two-phase to three-phase coordinate transformation unit.

20. The method of claim 17, wherein the step of transforming the d-axis DC voltage signal and the q-axis AC voltage signal to the three-phase command signal further comprises:
transforming the d-axis DC voltage signal and the q-axis AC voltage signal to an α-axis voltage signal and a β-axis voltage signal of a stationary coordinate system through a rotary-to-stationary coordinate transformation unit;
transforming the α-axis voltage signal and the β-axis voltage signal to a three-phase voltage signal through a two-phase to three-phase coordinate transformation unit; and
superimposing the three-phase voltage signal with a pulse width modulation signal in a non-zero voltage vector direction to obtain the three-phase command signal, wherein a voltage resultant vector of the pulse width modulation signal in one control cycle is zero.

21. The method of claim 17, wherein the step of transforming the three-phase command signal to the three-phase control signal is implemented through a two-level converter.

22. The method of claim 17, further comprising:
transforming the three-phase current feedback signal to a d-axis current feedback signal and a q-axis current feedback signal through a coordinate transformation unit, according to the initial value of the rotor position.

23. The method of claim 22, further comprising:
transforming a d-axis DC current signal to the d-axis DC voltage signal according to the d-axis current feedback signal; and
transforming a q-axis AC current signal to the q-axis AC voltage signal according to the q-axis current feedback signal.

24. The method of claim 17, wherein the generated estimation value of the rotor position is the initial value of the rotor position when both the d-axis DC voltage signal and the q-axis AC voltage signal are zero.

25. The method of claim 17, wherein the q-axis AC voltage signal or the high-frequency signal is a sine wave signal, a triangular wave signal, a square wave signal or a trapezoidal wave signal.

26. The method of claim 17, wherein a level of the d-axis DC voltage signal is greater than zero.

* * * * *